US012636596B2

(12) United States Patent
Beckingham

(10) Patent No.: US 12,636,596 B2
(45) Date of Patent: May 26, 2026

(54) WASTE OIL HANDLING APPARATUS

(71) Applicant: Daryl Beckingham, Narol (CA)

(72) Inventor: Daryl Beckingham, Narol (CA)

( * ) Notice: Subject to any disclaimer, the term of this patent is extended or adjusted under 35 U.S.C. 154(b) by 685 days.

(21) Appl. No.: 18/150,475

(22) Filed: Jan. 5, 2023

(65) Prior Publication Data

US 2023/0256358 A1 Aug. 17, 2023

Related U.S. Application Data

(63) Continuation of application No. 16/255,163, filed on Jan. 23, 2019, now abandoned.

(60) Provisional application No. 62/624,934, filed on Feb. 1, 2018.

(51) Int. Cl.
| | |
|---|---|
| *B01D 17/02* | (2006.01) |
| *B01D 17/12* | (2006.01) |
| *B01D 21/00* | (2006.01) |
| *B01D 21/02* | (2006.01) |
| *B01D 21/24* | (2006.01) |
| *B01D 21/30* | (2006.01) |
| *B01D 21/34* | (2006.01) |

(52) U.S. Cl.
CPC ...... *B01D 17/0214* (2013.01); *B01D 17/0211* (2013.01); *B01D 17/12* (2013.01); *B01D 21/0003* (2013.01); *B01D 21/0006* (2013.01); *B01D 21/0018* (2013.01); *B01D 21/10* (2013.01); *B01D 21/2405* (2013.01); *B01D 21/2444* (2013.01); *B01D 21/245* (2013.01); *B01D 21/302* (2013.01); *B01D 21/34* (2013.01)

(58) Field of Classification Search
CPC ...................................................... B01D 21/10
See application file for complete search history.

(56) References Cited

U.S. PATENT DOCUMENTS

| | | | | | |
|---|---|---|---|---|---|
| 5,477,897 | A | * | 12/1995 | Scofield | B67C 11/02 141/105 |
| 5,706,873 | A | * | 1/1998 | Benoit | F16N 33/00 141/331 |
| 6,109,313 | A | * | 8/2000 | Phelps | B67D 7/02 141/340 |
| 2008/0066823 | A1 | * | 3/2008 | Jin | F16N 31/00 141/2 |

* cited by examiner

*Primary Examiner* — Bradley R Spies
*Assistant Examiner* — Jeannie Mcdermott
(74) *Attorney, Agent, or Firm* — Kyle R. Satterthwaite; Ryan W Dupois; Ade & Company Inc.

(57) ABSTRACT

A waste oil handling apparatus features a tank with draining compartments for receiving waste oil containers in inverted and elevated positions above the tank floor. Multiple drain ports communicate with the tank interior at different elevations relative to the floor for draining accumulated contents of varying density that have gravitationally separated into distinct layers at those elevations. The ports feature adjustable fittings for adjusting the levels from which the layered contents are drawn through the ports from the tank interior. The tank has a large cleanout access by which personnel can access the tank interior for thorough cleanout. The compartments are organized into one or more troughs, each having a pivotal lid thereon. Lift brackets under the floor enable lifted transport of the tank by pallet jack or forklift.

20 Claims, 5 Drawing Sheets

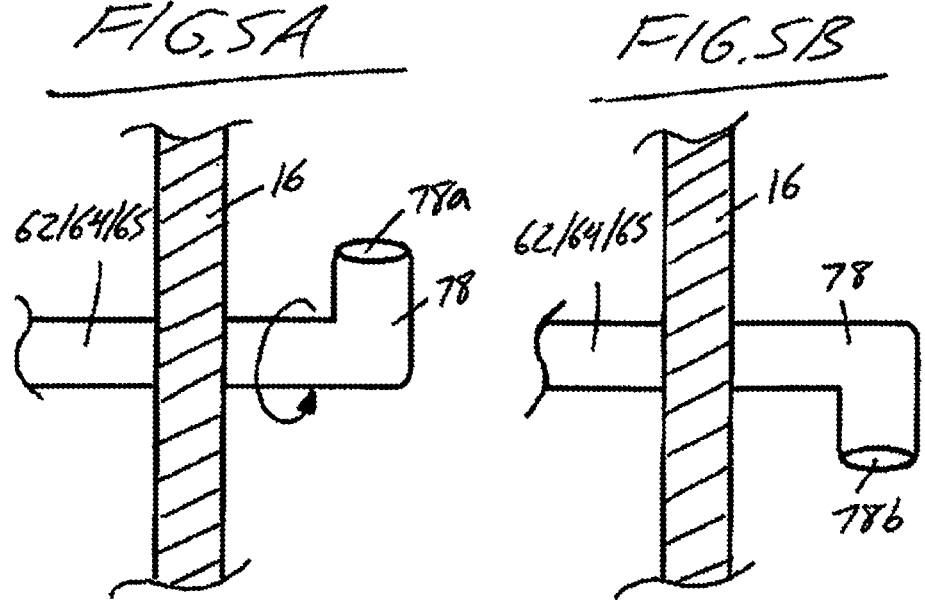

WASTE OIL HANDLING APPARATUS

CROSS-REFERENCE TO RELATED APPLICATIONS

This application is a continuation of U.S. Non-Provisional application Ser. No. 16/255,163, filed Jan. 23, 2019, the entirety of which is incorporated herein by reference.

FIELD OF THE INVENTION

The present invention relates generally to collection of waste oil, and more particularly to a solution for both collecting waste oil and separating contaminants therefrom before forwarding the collected oil to a recycler.

BACKGROUND

Numerous apparatuses for collection of waste fluids (used motor oil, leftover paint, etc.) have been proposed where jugs, cans or other containers of the waste fluid are placed in inverted positions for draining into a common collection vessel. U.S. Pat. No. 6,260,589 for example discloses a waste oil collection apparatus where a tank with a V-shaped and inclined floor has upper parts of its interior space subdivided into individual draining compartments that are properly sized to accommodate standard sized motor oil jugs, and that each drain into the shared floor space of the tank. A spout situated at the lowermost point of the inclined floor is opened to drain the collected motor oil into a separate receptacle. Such designs reduce labour requirements, as a single worker can simply place multiple oil containers upside down in the apparatus and leave them unattended to pour out their contents, as opposed to manually pouring out each container individually.

However, oil recyclers require that the used motor oil be free of contaminants (e.g. antifreeze, sand, other grit or debris) that can sometimes be found in used motor oil that consumers bring to a collection depot.

Accordingly, there remains room for improvement in collection equipment used at motor oil collection depots to both enable labour-efficient collection of used motor oil, while also ensuring a better quality used oil product that will be readily accepted by a recycler.

SUMMARY OF THE INVENTION

According to a first aspect of the invention, there is provided a waste oil handling apparatus comprising:

a handling tank comprising an interior space delimited above a bottom floor of said handling tank between a plurality of perimeter walls upstanding from said bottom floor around a perimeter thereof; and a plurality of draining compartments supported on said handling tank with a bottom of each draining compartment residing in elevated relation above the bottom floor of the singular tank, the bottom of each draining compartment having a drain therein and each draining compartment being sized and configured to receive and hold a respective waste oil container therein in an inverted state dumping contents of said oil container through said drain into the interior space of the handling tank and downwardly toward the bottom floor thereof;

a plurality of drain ports on the handling tank that fluidly communicate with the interior space thereof, at different respective elevations above the floor of said handling tank and below the bottom of each draining compartment, for respective draining of accumulated tank contents of varying density that have gravitationally separated into distinct layers at said different respective elevations, said plurality of drain ports including at least a primary drain port for draining of an upper waste oil layer from the singular holding tank, and a secondary drain port for draining an underlying antifreeze layer from the singular holding tank, of which said primary drain port fluidly communicates with the interior space of the handling tank at a greater elevation above the bottom floor thereof than said secondary drain port; and valving installed in operable relation to said plurality of drain ports, and selectively switchable between the following operational states:

an oil pumping state allowing pumped flow through said primary drain port, while preventing flow through the secondary drain port, thereby enabling pumped drainage of said upper waste oil layer independently of the underlying antifreeze layer; and an antifreeze pumping state allowing pumped flow through said secondary drain port, while preventing flow through said primary drain port, thereby enabling pumped drainage of said underlying antifreeze layer independently of the upper waste oil layer.

According to a second aspect of the invention, there is provided a waste oil handling apparatus comprising:

a handling tank comprising an interior space delimited above a bottom floor of said handling tank between a plurality of perimeter walls upstanding from said bottom floor around a perimeter thereof;

a plurality of draining compartments situated in elevated relation above the bottom floor of the handling tank, each draining compartment having a drain and each being sized to receive a respective waste oil container therein in an inverted state dumping contents of said oil container through said drain into the interior space of the handling tank; and at least one drain port in fluid communication with the interior space of the tank and having an adjustable fitting coupled thereto to adjust an elevation at which fluid is drawn from the interior space of the tank through said drain port.

According to a third aspect of the invention, there is provided a waste oil handling apparatus comprising:

a handling tank comprising an interior space delimited above a bottom floor of said handling tank between a plurality of perimeter walls upstanding from said bottom floor around a perimeter thereof;

a plurality of draining compartments situated in elevated relation above the bottom floor of the handling tank, each draining compartment having a drain and each being sized to receive a respective waste oil container therein in an inverted state dumping contents of said oil container through said drain into the interior space of the handling tank; and a cleanout access sufficiently sized to admit one or more personnel to the interior space of the handling tank for cleanout purposes.

According to a fourth aspect of the invention, there is provided a waste oil handling apparatus comprising:

a handling tank comprising an interior space delimited above a bottom floor of said handling tank between a plurality of perimeter walls upstanding from said bottom floor around a perimeter thereof;

a first container trough running along a first one of the
perimeter walls in elevated relation above the bottom
floor of the handling tank;

a second container trough running along a second one of
the perimeter walls in elevated relation above the
bottom floor of the handling tank;

each container trough being subdivided into a plurality of
draining compartments each having a drain and each
being sized to receive a respective waste oil container
therein in an inverted state dumping contents of said oil
container through said drain into the interior space of
the handling tank; and a respective lid for each container trough, wherein each
lid is hinged to the respective trough for pivoting
between a closed position closing off the trough at a
topside thereof and a lifted open position revealing the
topside of the trough.

According to a fifth aspect of the invention, there is
provided a waste oil handling apparatus comprising:

a handling tank comprising an interior space delimited
above a bottom floor of said handling tank between a
plurality of perimeter walls upstanding from said bot-
tom floor around a perimeter thereof;

a plurality of draining compartments situated in elevated
relation above the bottom floor of the handling tank,
each draining compartment having a drain and each
being sized to receive a respective waste oil container
therein in an inverted state dumping contents of said oil
container through said drain into the interior space of
the handling tank; and lift brackets attached to the tank below the floor thereof
and defining elongated open-ended channels for receiv-
ing blades of a pallet jack or forklift blades therein for
lifted transport of the tank.

According to a sixth aspect of the invention, there is
provided a method of draining accumulated content from a
tank of a waste oil handling apparatus in which said accu-
mulated content has gravitationally separated into multiple
layers, including an upper fluid layer of waste oil and a lower
fluid layer of a greater density fluid than said oil, said
method comprising:

(a) evacuating oil from the upper fluid layer into a primary
oil collection tank through a primary drain port of the
handling tank at a first elevation above a floor of the
handling tank;

(b) upon detection that accumulation of the lower fluid
layer is building in height and approaching the first
elevation, ceasing evacuation of oil through the pri-
mary drain port and initiating evacuation of the greater
density fluid from the lower fluid layer into one or more
fluid collection containers through a secondary drain
port of the handling tank that is situated at lower
elevation than the primary drain port; and (c) once the lower fluid layer has been reduced to a safe
level sufficiently below the first elevation, ceasing
evacuation of the greater density fluid through the
secondary drain port and re-initiating evacuation of the
oil from the upper fluid layer into the primary oil
collection tank through the primary drain port of the
handling tank.

BRIEF DESCRIPTION OF THE DRAWINGS

One embodiment of the invention will now be described
in conjunction with the accompanying drawings in which:

FIGS. 5A and 5B schematically illustrate use of an
adjustable fitting at a drain port of the waste oil handling
apparatus to control an elevation from which fluid is drawn
from an internal tank space of the apparatus.

DETAILED DESCRIPTION

Figure 1:
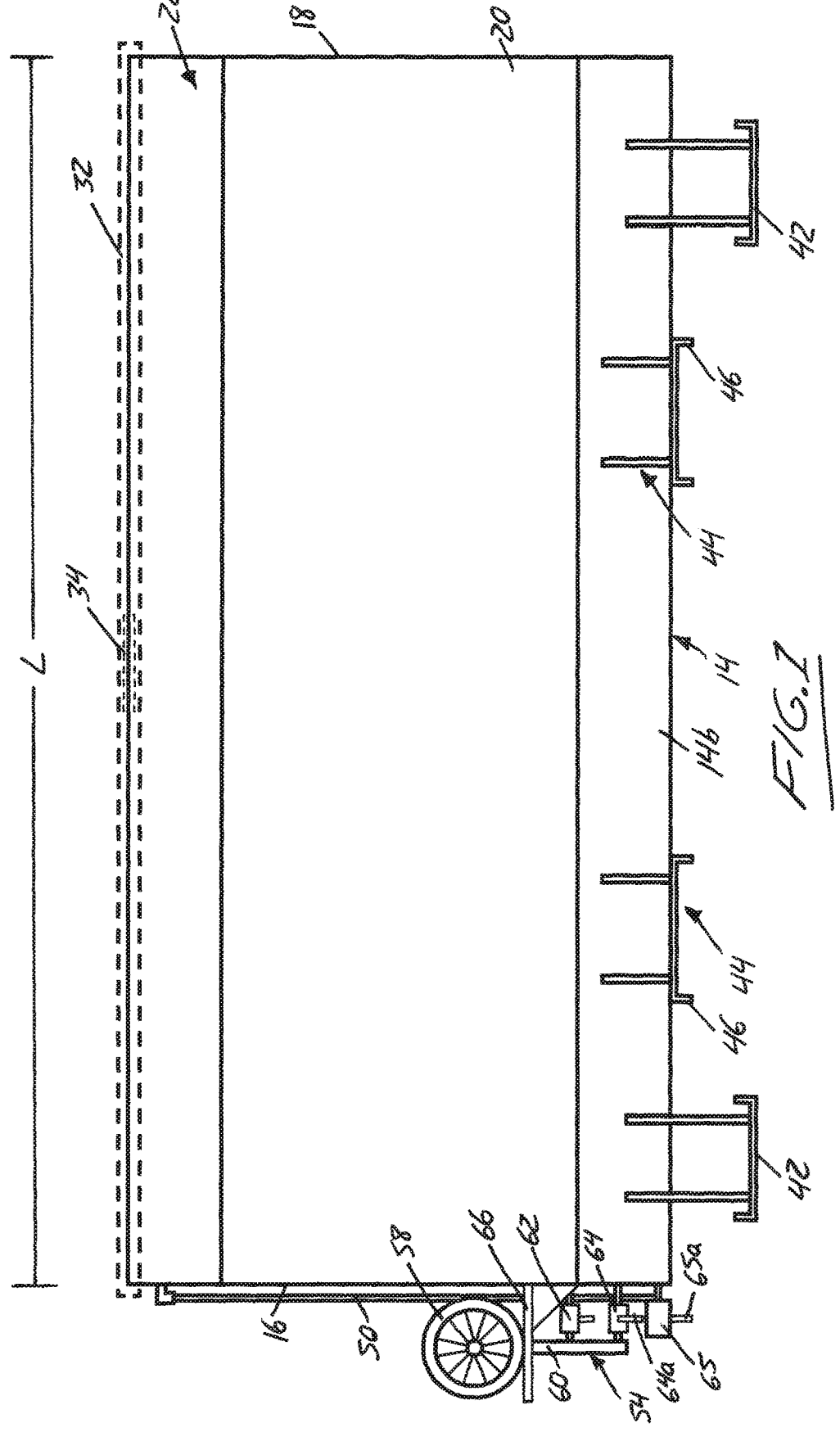
FIG. 1 is a side elevational view of a waste oil handling
apparatus for use at used oil collection depot.
Figure 2:
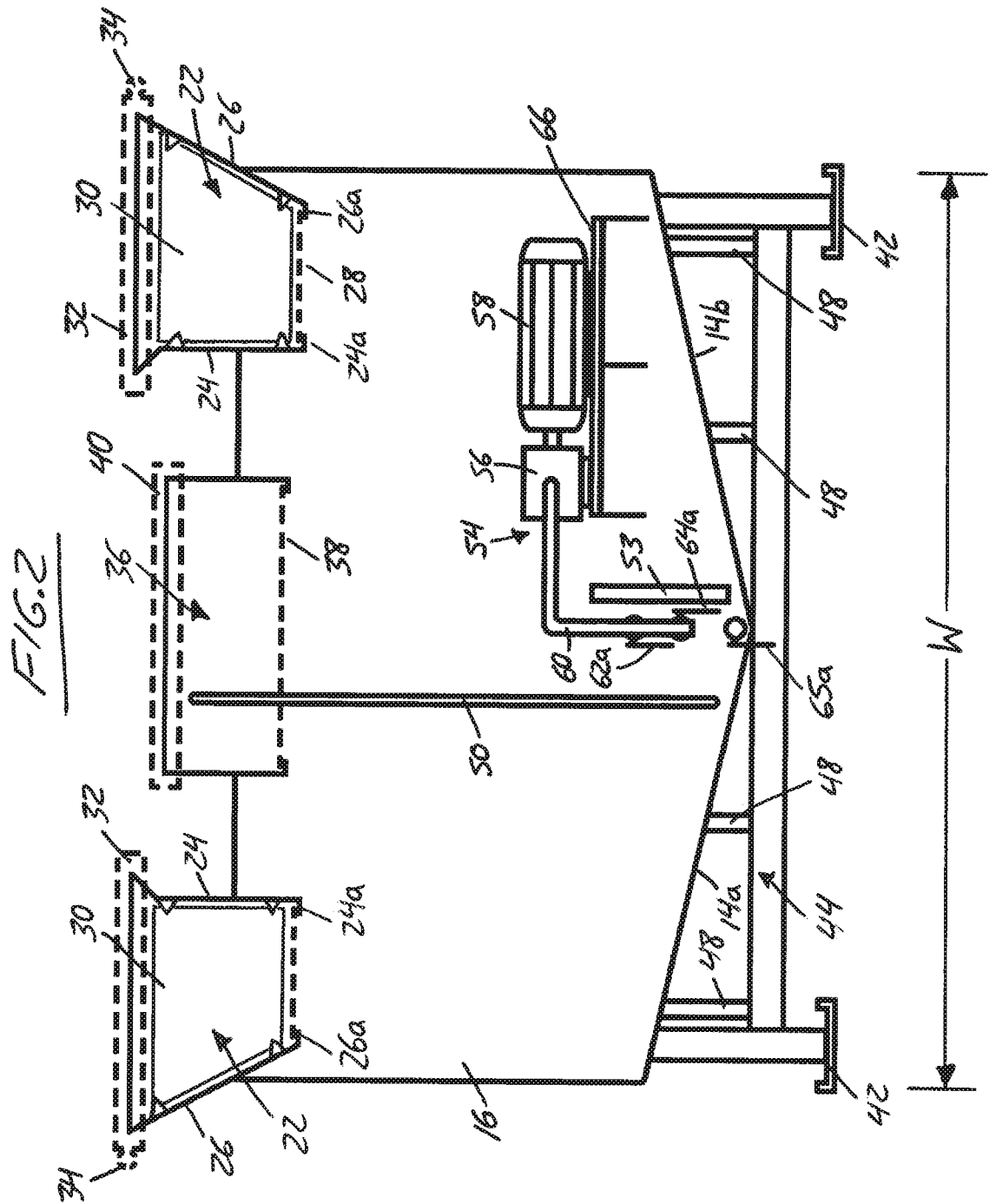
FIG. 2 is an end elevational view of the waste oil handling
apparatus of FIG. 1.
Figure 3:
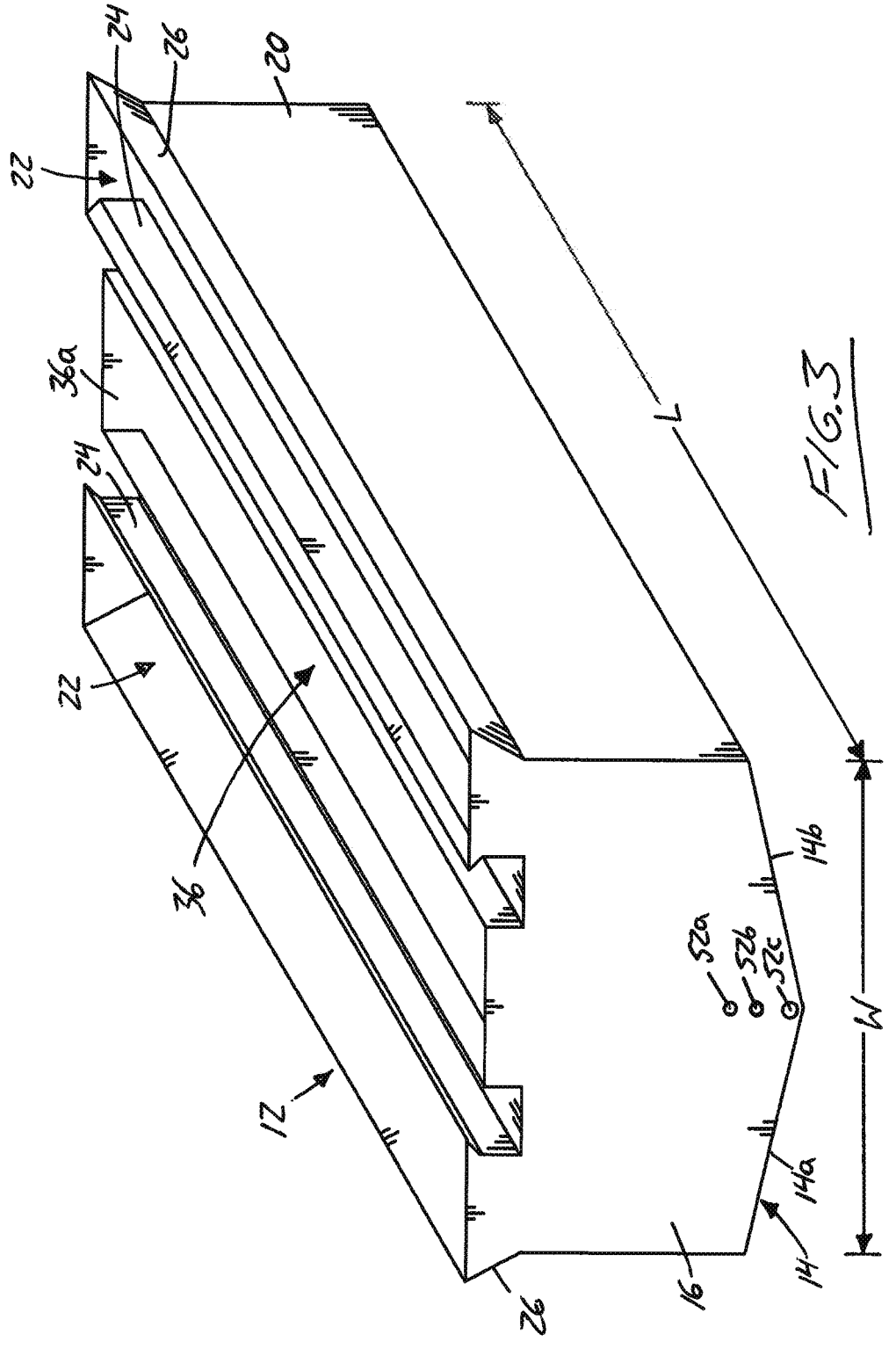
FIG. 3 is a perspective view illustrating the general tank
shape of the waste oil handling apparatus of FIG. 1.

FIGS. 1 and 2 illustrate a waste oil handling apparatus 10
according to one embodiment of the present invention. The
main constituent component of the apparatus is a large-
volume handling tank 12 having a length dimension L
measured horizontally in a longitudinal direction of the
handling tank, and a width dimension W measured horizon-
tally in a transverse direction perpendicular to said longitu-
dinal direction. The handling tank features a bottom floor 14,
and four perimeter walls standing vertically upward from the
bottom floor 14 around the perimeter thereof. These four
perimeter walls include front and rear end walls 16, 18
spanning the width dimension W in the transverse direction
of the handling tank at opposite ends thereof, and two
elongated side walls 20 spanning the length dimension L in
the longitudinal direction of the handling tank at opposing
sides thereof. In the illustrated embodiment, the handling
tank has an elongated shape of notably greater length than
width. The bottom floor 14 is of a shallow V-shaped con-
figuration in transverse cross-sectional planes cut vertically
through the handling tank in the transverse direction,
whereby the floor has two convergingly sloped halves 14a,
14b that angle obliquely downward and inward from the
bottom of the two side walls 20 to meet one another at a
lowermost midpoint of the floor at a transverse center of the
handling tank.

The four perimeter walls of the handling tank delimit an
interior space thereof above the bottom floor 14 for collec-
tion of used motor oil or other waste oil within this space.
A respective container trough 22 runs longitudinally of each
side wall 20 of the handling tank at the top end thereof, and
spans the full length of the handling tank from the front end
wall 16 to the opposing rear end wall 18. In the illustrated
embodiment, each trough has a cross-section of right-trap-
ezoidal shape in the transverse cross-sectional planes of the
handling tank. An inner wall 24 of each trough stands
vertically upright at a distance inward from the respective
side wall 20 of the handling tank, while an outer wall 26 of
each trough angles obliquely upwardly and outwardly away
from the opposing inner wall 24 and beyond the respective
side wall 20 of the handling tank 12. The bottom ends of the
inner and outer trough walls 24, 26 reside at a generally
equal elevation to one another, and feature in-turned flanges
24a, 26a atop which a grating 28 is horizontally seated to
define a perforated floor 28 of the trough. This perforated
floor grating 28 spans the full length of the trough 22.

In each trough, a series of primary vertical dividers 30 are
situated at regular intervals along the trough length, and lie
in the transverse width direction of the handling tank so as
to divide each trough into a plurality of draining compart-
ments 31 that are arranged in series from one end of the
trough to the other. Each draining compartment has a width
that is measured between two neighbouring primary dividers. This compartment width slightly exceeds the width of a standard one-gallon oil jug or similar waste oil container. Accordingly, each draining compartment is sized to accommodate placement of a one-gallon oil container therein in an inverted position pouring its contents down through the perforated floor grating 28 into the interior space of the handling tank 12, where the dumped waste oil accumulates on the bottom floor 14 of the handling tank. The openings in the perforated floor grate 28 thus serve as drain holes at the bottom of each draining compartment. It will be appreciated that other drain structures may be used in the bottom of the draining compartments, such as the funnel-shaped drains in aforementioned U.S. Pat. No. 6,260,589, the entirety of which is incorporated herein by reference. However, use of a flat grating 28 simplifies the construction in the interest of reduced complexity and cost.

Each trough 24 features a respective lid 32 hinged to the top end of the inner trough wall 24 for pivotal movement thereon between a closed position seated atop the opposing outer trough wall 26 to close off the draining compartments, and an open position lifted up off the outer trough wall 26 and standing upright from the inner trough wall 24 to reveal access to the draining compartments at the open topside of the trough. In the illustrated embodiment, a singular lid 34 spans the full length of each trough 22. In other embodiments, a plurality of separately hinged lids of lesser size and weight may collectively span each trough to reduce the manual effort needed to open any individual lid. In either case, at least one gas lift strut, and preferably two gas lift struts respectively situated at or adjacent opposite ends of each lid, may be pivotally coupled between the trough and the lid for aided lifting thereof into the open position. The illustrated embodiment features a handle 34 attached to each lid at a lengthwise mid-point of the lid's outer edge that overhangs the outer trough wall 26 in the lid's closed position.

In one embodiment, each trough lid 34 features one or more container cap support shelves mounted to the underside of the lid, i.e. the side thereof that faces downwardly into the trough in the lid's closed position. When the lid is lifted into the open position, the shelf juts outward from the opened lid toward the outer side of the trough, and provides a storage area above one or more of the draining compartments for holding the removed caps of the oil containers. In one embodiment, a singular shelf spans a substantial entirety of the trough length to provide such storage areas for all of the trough's storage compartments. In other embodiments, a series of small shelves may alternatively be employed at respective positions along the trough.

A user of the apparatus 10 starts at one end of the handling tank 12, where he/she removes the cap from a first oil container, places the cap on a first storage area of the shelf above the first draining compartment at this end of the handling tank, and places the uncapped oil container in an inverted draining position inside the first draining compartment. The user than uncaps a second oil container, places the cap on the second storage area of the shelf above a second draining compartment next to the first, and places the second uncapped oil container in the inverted draining position inside the second draining compartment. This placement of caps and inverted containers is repeated down the full length of the first trough until each draining compartment thereof is occupied, and then this same loading of the other trough with used oil containers is performed along the other side of the handling tank. After the second trough is filled with used uncapped and inverted oil containers, the user can return to the first draining compartment at the first trough, by which time the first uncapped oil container should be fully drained. The first oil container is removed from the trough, and re-capped using the respective cap from the first storage area on the cap support shelf. The second oil container is then likewise removed and re-capped, and this removal process repeated until both troughs are fully unloaded. If sufficient oil containers are on-hand, the troughs can then be re-loaded again to drain a subsequent batch of used oil containers into the interior space of the handling tank 12.

The handling tank 12 features cleanout access 36 by which the interior space of the tank can be accessed by personnel to inspect and cleanout the tank between uses. The access 36 features a full-length, climb-in access opening 36a spanning the entire length of the handling tank 12 between the two container troughs 22. A width of the access opening 36a exceeds the width of each trough in order to allow cleanout personnel to climb fully inside the handling tank for thorough inspection and cleaning of the tank's interior space.

The large access opening 36a also serves as part of an additional draining station for draining of larger waste oil containers (e.g. drums or pails) than is possible at the smaller draining compartments of the trough. To avoid the need to manually support such larger oil containers during pouring thereof into the handling tank's interior space through the access opening 36a, this additional draining station features another grating 38 that is suspended inside the handling tank at or shortly below the access opening in elevated relationship above the bottom floor of the handling tank. This grating 38 defines an elevated and perforated floor of the additional draining station, much like the elevated and perforated floor grates 28 of the container troughs 22. This grating 38 resides adjacent one of the handling tank's end walls 16, 18 and spans only a small fractional length of the overall access opening, leaving the remainder thereof unobstructed for the cleaning personnel's access to the tank interior. Accordingly, a large waste oil container that exceeds the size of the smaller draining compartments of the container troughs can be lifted up over the respective end wall of the handling tank, and tipped over through the access opening 36a into an inverted position atop grating 38 to dump the container's compartments into the interior of the space of the handling tank through the perforated drain openings of the grating 38.

The access opening 36a is thus shared by both the cleanout access 36 and the additional draining station in order to serve two functions and thereby provide structural efficiency in the design of the handling tank. A removable access lid 40 normally resides over the access opening 36a in a closed position spanning the entirety thereof to prevent exposure of the handling tank's interior space to rain, snow, road dust, debris, etc. One or both ends of the access lid 40 may be provided with a handle for easier pulling of the lid into an open position slid at least partially off the access opening. As an alternative to a removable lid, the access lid may be hinged to the handling tank for pivotal lifting and lowering thereof like the trough lids, or may be a track-mounted sliding lid that cantilevers off the end of the tank when slid open to reveal the access opening 36a.

The bottom floor 14 of the handling tank 12 is elevated off the ground by a set of support feet 42 mounted to the underside of the bottom floor 14 near the four perimeter corners of the tank where the side walls 20 and end walls 16, 18 meet. Two lift brackets 44 are also attached to the underside of the handling tank's bottom floor. Each lift bracket 44 features a length of open-ended, open-bottomed channel 46 that runs widthwise of the handling tank in the transverse direction at a location spaced inwardly from a respective one of the handling tank's end walls 16, 18 in the longitudinal direction. The center-to-center spacing between the channels 46 of the two lift brackets 44 is equal to the center-to-center spacing of the blades of a conventional forklift or pallet jack, whereby such lifting equipment can be used to lift the waste oil handling apparatus, for example during loading onto a transport truck for delivery to a waste oil recycling depot site, and during placement thereof at a suitable location at said site.

The channels 46 of the lift brackets 44 run in the smaller width direction of the handling tank rather than the longer length direction thereof to avoid or minimize cantilevering of the handling tank 12 off the blades of the lifting equipment, thereby enabling safe, stable lifting and transport. By having the lifting brackets in elevated relation to the tank's support feet 42, the downward-depending side walls of the channels 46 do not bear any weight of the handling tank 12 when placed in an intended spot of use with the support feet on the ground 42. As shown in FIG. 2, the closed topside of each channel 46 abuts against the underside of the tank floor 14 at the lowermost midpoint thereof, while support legs 48 of different height attach less central areas of the channel to the sloped halves 14a, 14b of the tank 14 at distances outward form the lower midpoint of the tank floor 14.

A transparent tubular level gauge 50 is supported in a vertically upright orientation just outside the front end wall 16 of the handling tank 12. A bottom end of the level gauge 50 communicates with the interior space of the handling tank just above the tank floor 14 near the lowermost midpoint thereof via an below fitting that passes through a hole in the front end wall 16. Likewise, a top end of the level gauge 50 communicates with the interior space of the handling tank near the top end thereof via an elbow fitting that passes through another hole in the front end wall 16 near the access opening 36a. The transparent tube of the level gauge 50 allows personnel to monitor the overall fill level of the handling tank from the exterior thereof.

In addition to the two holes by which the level gauge 50 communicates with the interior of the handling tank, the front end wall 16 of the handling tank also features three drain ports 52a, 52b, 52c that are positioned at a vertical, longitudinally oriented midplane of the tank that is also occupied by the lowermost midpoint of the tank floor 14. A primary oil drain port 52a resides at the highest elevation of the three drain ports, and thus is resides furthest from the tank floor 14 in spaced elevation thereabove. A secondary antifreeze drain port 52b resides at an intermediate or second highest elevation of the three drain ports, thus residing between the primary oil drain port 52a and the tank floor 14. Finally, a tertiary sludge drain port 52c resides a lowest elevation of the three drain ports, thus residing closest to the tank floor 14 and below the primary and secondary drain ports 52, 52b.

The waste oil being brought to the collection depot at which the handling apparatus is located may contain liquid contaminants or impurities such as antifreeze, and solid contaminant or impurities such as sand or other grit material. In this initial state, the waste oil is thus referred to herein as "raw waste oil" from which such impurities must be separated in order to provide a pure enough oil product for an oil recycler. When the raw waste oil pours into the interior space of the handling tank from the draining compartments of the container troughs 22, it accumulates atop the tank floor 14, and this accumulated tank content will gravitationally separate into distinct layers due to differences in density among the oil content and contaminants of the raw waste oil.

Antifreeze, as a fluid of greater density than oil, will separate itself from the oil, resulting in an upper fluid layer of waste oil and a distinct lower fluid layer of greater density antifreeze beneath said upper layer of waste oil. Sedimentary particles, such as sand, are of greater density than both the waste oil and the antifreeze, and thus will gravitationally settle out from the two fluids and create a lowermost sludge layer atop the tank floor 14.

The three drain ports are respectively positioned to individually align with these distinct layers of the accumulated tank content, whereby the separated oil can be evacuated via the uppermost primary drain port, the separated antifreeze can be evacuated via the intermediate secondary drain port, and the sediment-containing sludge can be drained via the lowermost tertiary drain port. A sight glass 53 is installed in the front end wall 16 beside the drain ports, and spans at least a partial height of the side wall from below the secondary drain port 52b to above the primary drain port 52a. This way, operating personnel can readily and easily detect the levels of the distinct layers of the accumulated tank contents on a visual basis from outside the tank.

The primary and secondary drain ports feed into a shared pumping circuit 54. This pumping circuit 54 feature a pump 56, a pump motor 58 whose driveshaft is operably coupled to the pump for driven operation thereof, a shared fluid conduit 60 connected to an inlet of the pump, and primary and secondary feed conduits 62, 64 connected from the primary and secondary drain ports 52a, 52b to the shared fluid conduit 60. The shared fluid conduit 60 and the two feed conduits 62, 64 thus form two flow paths from the interior space of the handling tank to the pump, each flow path passing through a respective one of the primary and secondary drain ports 52a 54b. Each feed conduit 62, 64 has a respective valve 62a, 64a installed therein for selective opening and closing of the respective flow path to allow or prevent flow through the respective drain port depending on the open or closed state of the valve.

A pump support shelf 66 is attached to the exterior of the front end wall 16 of the handling tank 12 for mounted support of the pump 56 and pump motor 58 atop the shelf 66. With the pump and motor thus mounted to the handling tank 12 in a secured position thereon so that the entire handling apparatus is a self-contained unit with an onboard pump, the shared fluid conduit may be rigid piping to which the valves 62a, 64a and suitable fittings are coupled to form the feed conduits. In other embodiments, for example where the pump and associated motor are provided separately of the tank, lengths of flexible hose with suitable fittings for connecting the valves 62a, 64a may alternatively be used to defined the shared pumping conduit while accommodating variable placement of the separate pump relative to the tank.

An output hose (not shown) is coupled to the outlet of the pump so that the fluids evacuated from the handling tank via the primary and secondary drain ports 52a, 52b can be directed into suitable receptacles. These receptacles preferably include a relatively large primary oil collection tank for receiving waste oil from the upper fluid layer of the tank contents through the primary drain port, as well as a set of smaller fluid collection containers (e.g. buckets or pails) for receiving antifreeze from the greater density lower fluid layer through the secondary drain port. A float switch or other level sensor (not shown) is preferably provided on the handling tank 12, and is operable to detect when the accumulated tank contents reach a predetermined level that exceeds the elevation of the primary drain port 52a. In response to this detected fill level, the float switch automatically starts the pump motor, and thus triggers activation of the pump 56. Suitable control circuitry for automated control of a pump based on the state of a float switch is well known, and thus not described herein in further detail.

In the shared pumping circuit, the primary valve 62a (i.e. the valve in the feed conduit 62 of the primary drain port 52a) is normally kept open, while the secondary valve 64a (i.e. the valve in the feed conduit 64 of the secondary drain port 52b) is normally kept closed, and the outlet of the output hose is initially placed in the primary oil collection tank. By default, operation of the pump will therefore draw clean waste oil from the upper fluid layer of the tank contents through the primary drain port 52a, and pump it into the large primary oil collection tank (not shown). Once filled, the primary oil collection tank will be picked up by, or delivered to, an oil recycler. This initial and default state of the pumping circuit, with the primary valve 62a open and the secondary valve 64a closed, is thus referred to as an oil pumping state.

When operating personnel notice that the antifreeze in the lower fluid layer is growing in height to an elevation approaching the primary drain port 52a, they switch the pumping circuit from the initial oil-pumping state to an anti-freeze pumping state, in which the secondary valve 64a is opened and the primary valve 62a is closed, whereby operation of the pump 56 now evacuates antifreeze from the lower fluid level through the secondary drain port 52b. As part of this switch from the oil-pumping state to the anti-freeze-pumping state, the operating personnel also relocate the outlet of the output hose from the primary oil collection tank to a first one of the smaller fluid collection containers (e.g. pail or bucket). When this pumping of the antifreeze initially starts, there will be residual waste oil remaining in the shared pumping circuit, and so a mixture of the evacuated antifreeze and residual oil is pumped into this secondary collection container until all residual oil has been flushed from the circuit. Once the circuit has been flushed clean, for example as visually confirmed by an absence of oil in the antifreeze being pumped into the first fluid collection container, then the outlet of the output hose is moved form the first fluid collection container to a second fluid collection container. Pumping of pure antifreeze into the second fluid collection container is continued until the second fluid layer in the handling tank has been pumped down to an acceptable level sufficiently far below the primary drain port 52a, as visually confirmed through the sight glass 53.

At this point, the outlet of the output hose is placed back in the first fluid collection tank, which contains a mixture of oil and antifreeze, and the pumping circuit is returned to the oil-pumping state so as to once again evacuate oil from the holding tank via the primary drain port. Initially, this oil being pump out through the shared pumping circuit will contain some residual antifreeze left in the circuit from the antifreeze pumping operation, hence the output into the first fluid collection container before then returning the outlet of the output hose back to the larger primary oil collection tank. The mixture of oil and antifreeze in the first fluid collection container is then dumped back into the handling tank, for example through the access opening 36a at the additional draining station, so that this mixture can gravitationally separate out into the distinct fluid layers inside the handling tank. The pure antifreeze in the second fluid collection container can be dumped into a larger antifreeze collection tank for later pickup by, or delivery to, an antifreeze recycler.

The operating personnel may be a single operator, who performs repeated laps around the handling tank loading fresh waste oil containers into the troughs, removing emptied waste oil containers from the drops, and checking the sight glass during each lap, or at some other periodic interval, in order to determine when to temporarily switch from the oil pumping mode to the antifreeze pumping mode. A very labour efficient process for both collection and purification of waste oil is thus achieved, while also resulting in a secondary output product, namely recycle-ready antifreeze.

Over time, the amount of sludge formed by sedimentation on the tank floor 14 will increase, and so a cleanout is performed periodically after a thorough draining the waste oil and antifreeze from the upper fluid layers via the primary and secondary drain ports. A separate pump suitable for handling the thick sludge layer may be connected to the tertiary drain port 52c via a feed conduit 65 out the sludge. For the purpose of this sludge cleanout operation, the tertiary drain port 52c and attached feed conduit 65 are preferably of greater diameter than the primary and secondary drain ports and attached feed conduits. During or after this sludge pumping operation, one or more cleaning personnel can climb into the handling tank via the cleanout access 36 in order to scrape and wipe the tank floor 14 and perimeter walls and help displace the sludge along the tank floor toward the tertiary drain port 52c. The feed conduit 65 of the tertiary port features a respective valve 65a installed thereon to keep the tertiary drain port's flow path closed at all times other than during this sludge draining operation.

Figures 4A, 4B:
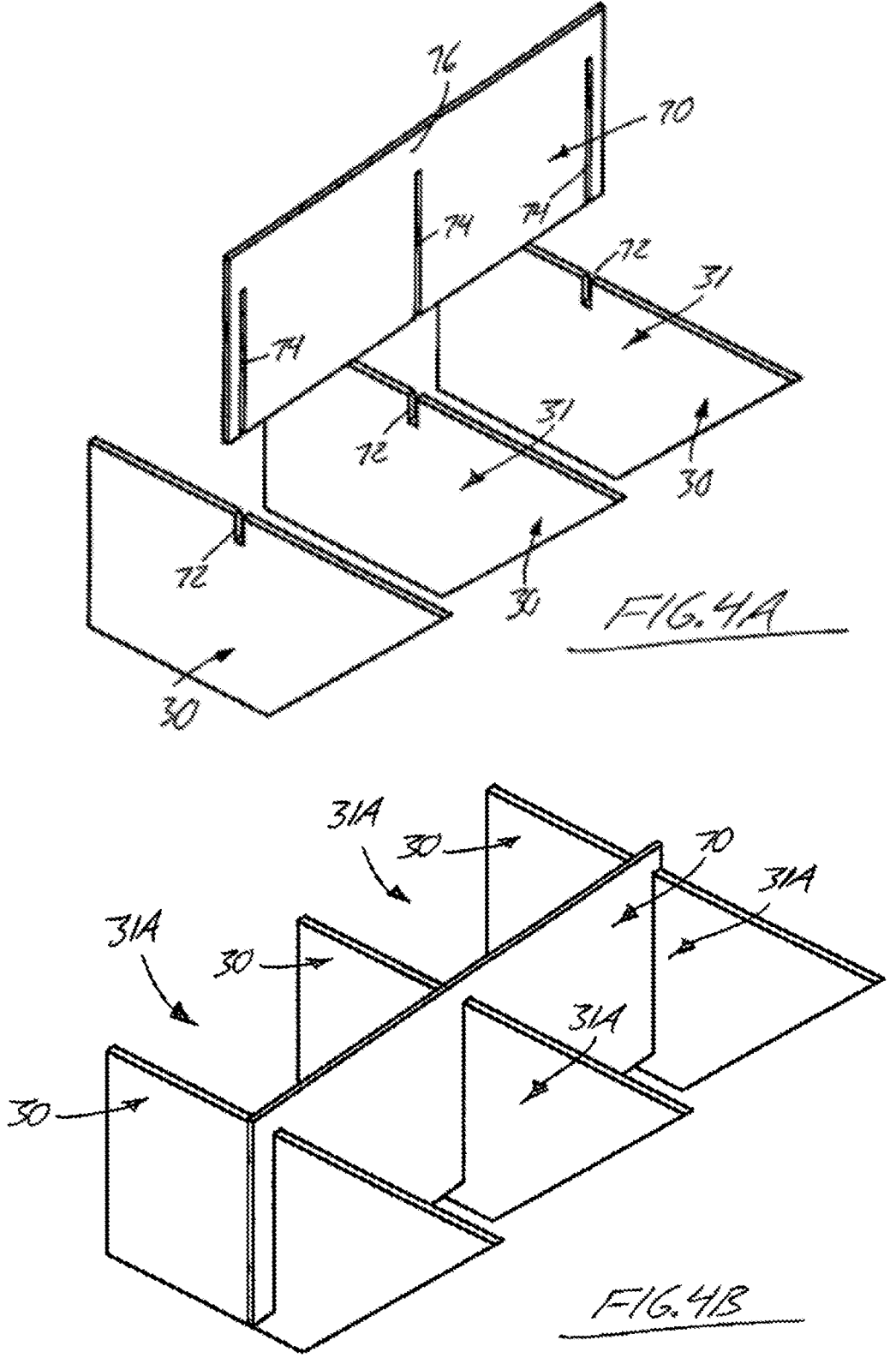
FIGS. 4A and 4B schematically illustrate use of dividers
in container troughs of the waste oil handling apparatus to
define compartments and sub-compartments of different size
for receipt of differently sized oil containers.

Turning to FIG. 4, In addition to the primary vertical dividers 30 in each trough 22, one or more removable secondary dividers 70 may be provided for the purpose of subdividing one or more of the draining compartments 31 into smaller draining sub-compartments 31A. FIG. 4 shows three neighbouring primary dividers 30, each of which has a notch 72 in the upper edge thereof. A cooperating secondary divider 70 is vertically oriented and lies perpendicular to the parallel vertical planes of the primary dividers 30, whereby the secondary divider 70 extends in the longitudinal direction of the trough 22. The secondary divider 70 has a set of vertically upright slots 74 therein that reach upwardly from the secondary divider's bottom edge. The spacing between the slots 74 is equal to the spacing between any neighbouring pair of the primary dividers 30. The secondary divider is lowered into engagement with the primary dividers by sliding the slots 74 downwardly over the primary dividers 30 at the notched areas 72. Once sufficient lowered, an intact area 76 of the secondary divider left between its top edge and the top ends of the slots 74 is seated inside the notches 72 at the top of the primary dividers 30.

The illustrated secondary divider is sufficiently long to span two neighbouring draining compartments, and has three slots 74 for engaging each of the three primary dividers 30 that delimit said two neighbouring draining compartments. However, larger secondary dividers spanning more than two draining compartments may be employed. Alternatively, a smaller secondary divider spanning only a single compartment may be used, and thus may have only two slots therein for engaging the notches of the two neighbouring primary dividers that delimit said single draining compartment. Each draining compartment spanned by the installed secondary divider 70 is subdivided into two smaller drainage sub-compartments, namely an inner sub-compartment nearest the inner wall of the trough and the transverse center of the tank, and an outer sub-compartment nearest the outer wall of the trough and respective side wall 20 of the tank FIG. 5 illustrates how an adjustable fitting 78 may be installed at the primary and/or secondary drain port 52a, 52b to adjust the particular elevation from which fluid is drawn from the handling tank through the respective drain port. In the illustrated embodiment, the fitting is an angled elbow fitting having one end coupled to the drain port in the front end wall 16 of the handling tank in a manner selectively rotatable relative thereto about the axis of the drain port, whereby such rotation changes the elevation of the opposite free end 78*a* of the fitting through which the tank contents are drawn during pumping operations. FIG. 5A shows the free end 78*a* of the adjustable fitting 78 in a fully-raised, upwardly-opening position of maximum elevation situated above the respective drain port, while FIG. 5B shows the free end 78*a* of the adjustable fitting 78 in a fully-lowered, downwardly-opening position of minimum elevation situated below the respective drain port. A laterally-opening center position (not shown) situated midway between the fully-raised and fully-lowered positions places the free end 78*a* of the angled fitting 78 at equal elevation to the respective drain port. The sight glass 53 can be used to gauge the relative levels of the different layers in the accumulated tank content to gauge the appropriate position to which each adjustable fitting should be adjusted.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A waste oil handling apparatus comprising:
   a handling tank comprising an interior space delimited above a bottom floor of said handling tank between a plurality of perimeter walls upstanding from said bottom floor around a perimeter thereof, and among which first and second side walls reside oppositely of one another; and
   a plurality of draining compartments supported on said handling tank with a bottom of each draining compartment residing in elevated relation above the bottom floor of the singular tank, the bottom of each draining compartment having a respective drain therein and each draining compartment being sized and configured to receive and hold a respective waste oil container therein in an inverted state dumping contents of said oil container through said respective drain into the interior space of the handling tank and downwardly toward the bottom floor thereof;
   a plurality of drain ports on the handling tank that fluidly communicate with the interior space thereof, at different respective elevations above the floor of said handling tank and below the bottom of each draining compartment, for respective draining of accumulated tank contents of varying density that have gravitationally separated into distinct layers at said different respective elevations, said plurality of drain ports including at least a primary drain port for draining of an upper waste oil layer from the singular handling tank, and a secondary drain port for draining an underlying antifreeze layer from the singular handling tank, of which said primary drain port fluidly communicates with the interior space of the handling tank at a greater elevation above the bottom floor thereof than said secondary drain port; and
   valving installed in operable relation to said plurality of drain ports, and selectively switchable between the following operational states:
   an oil pumping state allowing pumped flow through said primary drain port, while preventing flow through the secondary drain port, thereby enabling pumped drainage of said upper waste oil layer independently of the underlying antifreeze layer; and
   an antifreeze pumping state allowing pumped flow through said secondary drain port, while preventing flow through said primary drain port, thereby enabling pumped drainage of said underlying antifreeze layer independently of the upper waste oil layer;
   a first container trough running along said first side wall of the handling tank in elevated relation above, and in directly overhead relation to, the bottom floor of the handling tank, and comprising a first subset of the draining compartments, the bottoms and the respective drains of which both reside internally of said first side wall of the handling tank for direct drainage of the first subset of the draining compartments into the interior space of the handling tank from directly overhead thereof; and
   a second container trough running along said second side wall in elevated relation above, and in directly overhead relation to, the bottom floor of the handling tank, and comprising a second subset of the draining compartments, the bottoms and the respective drains of which both reside internally of said second side wall of the handling for direct drainage of said second subset of the draining compartments into the interior space of the handling tank from directly overhead of said interior space;
   whereby a user can load or unload a respective set of waste oil containers at either one of said first and second container troughs from a respective side of the handling tank while another set of waste oil containers already loaded into the other one of said first and second containers troughs is draining into the interior space of the waste oil container adjacent an opposing side of the waste handling tank.

2. The apparatus of claim 1 wherein the multiple drain ports further comprise a tertiary drain port that communicates with the interior space of the singular handling tank at a lesser elevation that both the primary drain port and the secondary drain port for draining of a bottommost sediment layer that has settled out from the waste oil and antifreeze layers.

3. The apparatus of claim 2 wherein the tertiary drain port is of greater size than the primary and secondary drain ports to better accommodate flow of thickened sludge from the sediment layer.

4. The apparatus of claim 1 comprising a shared pump operably connected to both of the primary and secondary drain ports for forced evacuation of the waste oil and antifreeze layers independently of one another via separate pumping operations performed with the valving in the waste oil pumping and antifreeze pumping states, respectively.

5. The apparatus of claim 4 wherein the shared pump is mounted to the tank for carrying therewith as an on-board component during transport of the tank.

6. The apparatus of claim 1 comprising a sight glass built into one of the perimeter walls of the singular handling tank, wherein the primary and secondary ports both reside in the same one of the perimeter walls as the sight glass.

7. The apparatus of claim 1 comprising an adjustable fitting coupled to at least one of the plurality of said drain ports to adjust an elevation at which fluid is drawn from the interior space of the tank through said one of the plurality of said drain port in order to accommodate variation in the layers of accumulated tank contents.

8. The apparatus of claim 7 wherein the adjustable fitting comprises an angled fitting having one end coupled to the drain port in a manner rotatable relative thereto, and an opposite end whose elevation is adjustable by rotation of the angled fitting relative to said one of the plurality of said drain ports.

9. The apparatus of claim 1 comprising a cleanout access sufficiently sized to admit one or more personnel to the interior space of the handling tank for cleanout purposes, wherein the perimeter walls of the tank further comprise end walls spanning between the first and second walls said cleanout access resides between the first and second troughs in a position of adjacency to at least one of two opposing end walls of the handling tank for access to said cleanout access from one or either of two opposing ends of the handling tank.

10. The apparatus of claim 9 wherein the cleanout access is a climb-in access situated at a top end of the handling tank.

11. The apparatus of claim 9 wherein the cleanout access comprises an opening that spans a substantially full length of the tank, and thus resides in adjacency to both of said two opposing ends walls of the handling tank.

12. The apparatus of claim 9 comprising an additional draining station that resides adjacent to said one of the two opposing end walls of the handling tank and is larger than any of the draining compartments, said additional draining station sharing a common opening with the cleanout access by which personnel can enter the interior space of the tank, and through which a larger waste oil container can be lowered into said additional draining station.

13. The apparatus of claim 12 wherein the additional draining station comprises an elevated floor suspended beneath a partial area of the common opening for receipt of the larger waste oil container atop said elevated floor.

14. The apparatus of claim 1 comprising a respective lid for each container trough, wherein each lid is hinged to the respective trough for pivoting between a closed position closing off the trough at a topside thereof and a lifted open position revealing the topside of the trough for access to the draining compartments.

15. The apparatus of claim 1 comprising at least one container cap support shelf positioned over the draining compartments of each trough for storage of waste oil container caps on said container cap support shelf during draining of said waste oil containers in the draining compartments.

16. The apparatus of claim 14 wherein each lid carries at least one container cap support shelf for storage of waste oil container caps thereon at a position over the respective trough while the lid resides in the open position during draining of said waste oil containers in said trough.

17. The apparatus claim 1 wherein the draining compartments are separated from one another in a longitudinal direction of the tank by primary dividers lying in a transverse direction of the tank, and at least one removable secondary divider is selectively engagable with a neighbouring pair of primary dividers to subdivide a respective draining compartment delimited between said neighbouring pair of primary dividers into two smaller draining subcompartments sized for receipt of smaller waste oil containers, wherein said neighbouring pair of primary dividers have notches in upper edges thereof and the secondary divider comprises a pair of slots that extend upwardly from a bottom edge of the secondary divider for hanging of the secondary divider at the notches in the neighbouring pair of primary dividers.

18. A method of draining accumulated content from the handling tank of claim 1, once said accumulated content has gravitationally separated into multiple layers, including the upper waste oil layer and the underlying antifreeze layer, said method comprising:

(a) with the valving in the oil pumping state, pumping oil from the upper waste oil layer into a primary oil collection tank through the primary drain port of the handling tank at the first elevation above the bottom floor of the handling tank;

(b) upon detection that accumulation of the underlying antifreeze layer is building in height and approaching the first elevation, ceasing pumped evacuation of oil through the primary drain port, switching the valving into the antifreeze pumping state, and initiating pumping of fluid from the antifreeze layer into one or more fluid collection containers through the secondary drain port of the handling tank; and (c) once the underlying antifreeze layer has been reduced to a safe level sufficiently below the first elevation, ceasing pumped evacuation of the fluid through the secondary drain port, switching the valving back into the oil pumping state, and re-initiating evacuation of the oil from the upper waste oil layer into the primary oil collection tank through the primary drain port of the handling tank.

19. The method of claim 18 wherein pumped evacuation of the oil and the greater density fluid in steps (a) through (c) is performed by pumping thereof through a shared pumping circuit, and step (b) comprises (i) first pumping the greater density fluid from the handling tank into a first fluid collection container, during which residual oil in the pumping circuit is flushed therefrom by the greater density fluid, resulting in a collected mixture of residual oil and greater density fluid in the first fluid collection container, and (ii) once said residual oil is fully flushed from said pumping lines, then pumping the second greater density fluid from the handling tank into a second fluid collection container.

20. A waste oil handling apparatus comprising:

a handling tank comprising an interior space delimited above a bottom floor of said handling tank between a plurality of perimeter walls upstanding from said bottom floor around a perimeter thereof; and a plurality of draining compartments supported on said handling tank with a bottom of each draining compartment residing in elevated relation above the bottom floor of the singular tank, the bottom of each draining compartment having a drain therein and each draining compartment being sized and configured to receive and hold a respective waste oil container therein in an inverted state dumping contents of said oil container through said drain into the interior space of the handling tank and downwardly toward the bottom floor thereof;

a plurality of drain ports on the handling tank that fluidly communicate with the interior space thereof, at different respective elevations above the floor of said handling tank and below the bottom of each draining compartment, for respective draining of accumulated tank contents of varying density that have gravitationally separated into distinct layers at said different respective elevations, said plurality of drain ports including at least a primary drain port for draining of an upper waste oil layer from the singular holding tank, and a secondary drain port for draining an underlying antifreeze layer from the singular holding tank, of which said primary drain port fluidly communicates with the interior space of the handling tank at a greater elevation above the bottom floor thereof than said secondary drain port; and valving installed in operable relation to said plurality of drain ports, and selectively switchable between the following operational states:

an oil pumping state allowing pumped flow through said primary drain port, while preventing flow through the secondary drain port, thereby enabling pumped drainage of said upper waste oil layer independently of the underlying antifreeze layer; and an antifreeze pumping state allowing pumped flow through said secondary drain port, while preventing flow through said primary drain port, thereby enabling pumped drainage of said underlying antifreeze layer independently of the upper waste oil layer.

* * * * *